US006820260B1

(12) United States Patent
Flockhart et al.

(10) Patent No.: US 6,820,260 B1
(45) Date of Patent: Nov. 16, 2004

(54) CUSTOMIZED APPLET-ON-HOLD ARRANGEMENT

(75) Inventors: Andrew D. Flockhart, Thornton, CO (US); Eugene P. Mathews, Barrington, IL (US); John Z. Taylor, Bedminster, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/776,937

(22) Filed: Jun. 17, 1999

(51) Int. Cl.[7] .................................................. G06F 9/44
(52) U.S. Cl. .................. 717/173; 717/171; 717/172; 717/176; 717/178; 709/204; 709/206; 370/352; 370/356
(58) Field of Search ................................ 717/169–173, 717/175–178, 103; 709/204, 206, 203, 313, 231, 238, 223; 370/352, 356; 707/10; 358/115

(56) References Cited

U.S. PATENT DOCUMENTS

| 6,256,773 | B1 | * | 7/2001 | Bowman-Amuah | ......... | 717/121 |
| 6,425,125 | B1 | * | 7/2002 | Fries et al. | .................. | 717/168 |
| 6,496,977 | B1 | * | 12/2002 | Hamilton et al. | ........... | 717/168 |
| 6,523,166 | B1 | * | 2/2003 | Mishra et al. | ............... | 717/174 |
| 6,675,204 | B2 | * | 1/2004 | De Boor et al. | ............ | 709/217 |

OTHER PUBLICATIONS

Title: Wireless Client/Server Computing for Personal Information Services and Applications, author: Elmagarmid et al, ACM, 1995.*
E. Margulies, *IVR Meets the Internet*, IVR Supplement, 1996, pp. 41–47.
*Netspeak's Hot Internet Sun Product*, Computer Telephony, Aug. 1996, vol. 5, Issue 8, pp. 120, 122–124.
*Internet Hop Off*, Computer Telephony, Mar. 1996, vol. 4, Issue 3, pp. 10, 12.
E. Margulies, *Vocaltec's Telephony Gateway—The Ultimate Internet Telephor Solution?*, Computer Telephony, Sep. 1996, vol. 4, Iss. 9, pp. 30, 32, 34–35.
Z. Grigonis, *Rockwell Teams with Dialogic to Build Groupware Servers for Small Centers*, Computer Telephony, Apr. 1996, vol. 4, Iss. 4, p. 112.
P. Roberts, *Dialogic and Vocaltec Open a Door to a World of Possibility*, Computer Telephony, Apr. 1996, vol. 4, Iss. 4, p. 4.
R. Grigonis, *Altigen's Mixed–Media Server Platform—Reshapes Zippy's CT Vision*, Computer Telephony, Apr. 1996, vol. 4, Iss. 4., p. 49.
Z. Grigonis, *Genesys Labs' and Tandem Team for Red Hot Call–Center Solutions*, Computer Telephony, Apr. 1996, vol. 4, Iss. 4., pp. 98–99.
*Microlog's Unique All–In–One Unique Agent*, Computer Telephony, Nov. 1998, vol. 6, Issue 11, pp. 41–42.

* cited by examiner

Primary Examiner—Chameli C. Das
(74) Attorney, Agent, or Firm—David Volejnicek

(57) ABSTRACT

When a call to a call center is enqueued to await an agent or placed on hold by an agent, an applet customized to satisfy an in-queue experience selected by the caller is downloaded to and executed on the caller's terminal. The applet presents information to the caller, and may also interact with the caller by, for example, gathering information from the caller. The time needed for execution of the selected applet is within a wait time negotiated with the caller. Preferably, the caller is identified (e.g., via the caller's address or identifier), and the applet is further customized for that caller's preferences, e.g., based on previously-gathered and stored information about that caller. When the agent is about ready to take the call, the caller is alerted. When an agent dequeues the call or takes the call off hold, connection of the agent with the client is (re)established.

27 Claims, 2 Drawing Sheets

CUSTOMIZED APPLET-ON-HOLD ARRANGEMENT

TECHNICAL FIELD

This invention relates generally to on-hold telecommunications terminals and relates specifically to communications terminals enqueued at a call center.

BACKGROUND OF THE INVENTION

Doing business on the Internet is a new and fast-growing industry. More and more frequently, businesses are providing on their web pages icons which Internet browsers can click to place a voice call over the Internet to a suitably-equipped agent at the business' call center. The economics of Internet call centers are essentially the same as those of traditional call centers, in that it is not economical to have agents sitting idle and waiting for callers to contact the call center. As in traditional call centers, then, the likelihood is that the Internet caller will be forced to wait in a queue for an available agent.

In the prior art, the enqueued callers were placed on hold at the automatic call distribution (ACD) system of the call center, and ACD resources were used to play announcements or other audio programs to the callers while the callers waited—what is commonly referred to as "music-on-hold." This approach ties up various ACD resources, such as time slots and announcement-circuit ports, and is limited in the ways in which the callers' in-queue experience can be enhanced and controlled.

The Internet, and particularly the World Wide Web, makes it possible for a call destination to download an applet for execution on a caller's terminal or to redirect the caller to another destination (URL). It is not known whether this capability has been exploited by any Internet call centers to provide an alternative to the conventional "music-on-hold".

SUMMARY OF THE INVENTION

This invention is directed to solving these and other problems and disadvantages of the prior art. Illustratively according to the invention, an applet (an application computer program) is customized for a user of a communications terminal whose communication is enqueued or on hold, and the customized applet is downloaded—from an ACD system, an adjunct processor, etc.—to the user's terminal/server and the downloaded applet is executed on that terminal/server to entertain the user, supply information to the user, and/or interact with the user. With the ability to download applets to users' terminals/servers, the users' in-queue or on-hold experience is now managed at their terminals/servers and not at the ACD systems. This provides an opportunity to create richer, unique, and customized in-queue and on-hold experiences for the users, and to do so without tying up resources of the call center's ACD system. (For purposes of this application, the term "on hold" is used broadly and includes the term "in queue". Likewise, the term "user" is used broadly to include any party to a communication, e.g., a caller or a called party.)

Generally according to the invention, a method of communicating involves putting a communication from a user's terminal in a queue or on hold, customizing a computer program for the user, and downloading the customized computer program to the terminal (including a server for, e.g., a "thin client") for execution by the terminal while the terminal's communication is on hold. At the terminal whose communication has been put on hold, the downloaded program is received and executed while the terminal is on hold. When the terminal's communication is taken off hold, execution of the program typically stops; alternatively, it may be allowed to continue to completion. The communication is put on hold illustratively until a resource becomes available to handle the communication, or selectively by a handler of the communication. Also illustratively, the amount of time that the communication will need to remain on hold is estimated by the communications entity (e.g., an ACD system) that is putting the communication on hold, and the actual amount of time that the communication will remain on hold is negotiated with the terminal (or its user) before the communication is put on hold—for example, the user is given an option to agree or not agree to the estimated on-hold time, or to select an even-longer on-hold time in return for some incentive. In either case, this allows selection of the downloaded program such that the program can be executed (i.e., its execution can be completed) within the amount of time that the communication will be on hold. This also allows the downloaded program to include a countdown program whose execution indicates to the user of the terminal the progress of expiration of that amount of on-hold time. The downloaded program may be a presentation program whose execution presents information (e.g., music, entertainment, education, product and/or service information, advertising, etc.) to the user of the terminal. Or, it may be an interactive program whose execution causes the terminal to interact with the user and preferably thereby gather information from the user, which information is then uploaded from the terminal, e.g., to the communications entity, such as an ACD system, that put the communication on hold. Preferably, the communicating user and/or the terminal are identified (e.g., via an e-mail address, an account number, an IP address, etc.), and the computer program is further customized (for example, on the basis of the URL of the web page from which contact with the call center was initiated) before downloading for the identified user or terminal by using information gathered and uploaded from this user or terminal in a prior communication.

While the invention has been characterized in terms of a method, it also encompasses apparatus that performs the method—such as an ACD system or a user's communications terminal, for example. The apparatus preferably includes an effector—any entity that effects the corresponding step, unlike a means—for each method step. The invention further encompasses a computer readable medium containing software which, when executed in a computer, causes the computer to perform the method steps.

As this summary indicates, the opportunity offered by this new environment is to make a caller's in-queue and other on-hold experiences richer and uniquely customized; more so than is possible in a traditional voice network. With the ability to download applets to the caller's terminal, opportunities exist to create unique and customized in-queue and on-hold experiences without the need to tie up resources at the call center's ACD system.

These and other features and advantages of the present invention will become more apparent from the following description of an illustrative embodiment of the invention considered together with the drawing.

DETAILED DESCRIPTION

Figure 1:
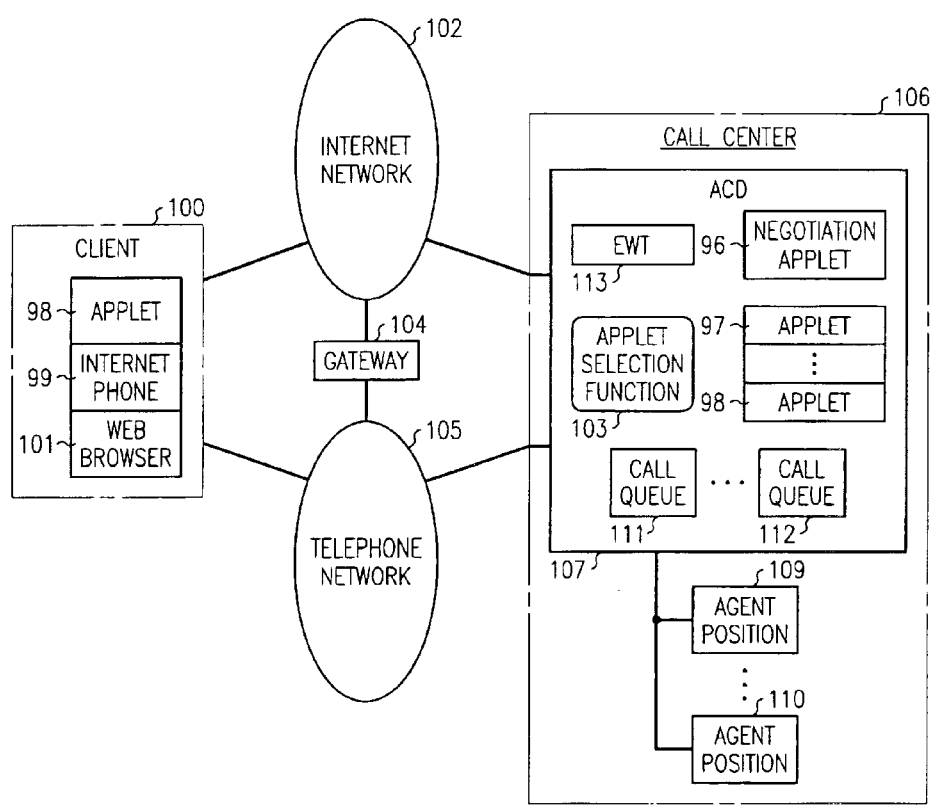
FIG. 1 is a block diagram of a communications network that implements an illustrative embodiment of the invention.

FIG. 1 shows a combined data-and-telephony communications network. The data portion of the network comprises at least one user terminal, such as a personal computer or a "thin client"/server combination, referred to as a client 100, connected by a data communications network, referred to as the Internet 102, to a World Wide Web-enabled call center 106. Client 100 executes a Web browser program, referred to as a browser 101, and is also preferably equipped with an Internet phone 99. The telephony portion of the communications network of FIG. 1 comprises the public or a private telephone system 105, and call center 106 is connected to telephone system 105. Internet phone 99 is illustratively a soft phone (telephone-emulation software executing on client 100) that may also be connected through client 100 to telephone system 105. Client 100 may be any desired terminal, e.g., a data terminal, a PC, or an intelligent telephone. However, client 100 must be able to receive downloaded applets (computer programs) and execute them.

Call center 106 conventionally includes an automatic call distributor (ACD) 107, and a plurality of call-center agent positions 109–110 served by ACD 107. Call center 106 is Web-enabled in that ACD 107 is able to engage in both telephone and Internet communications. ACD 107 implements one or more call queues 111–112, one for each agent split or skill (a group of agents) defined by ACD 107. Each agent position 109–110 includes communications equipment for receiving telephone calls and data (Internet) calls. ACD 107 further includes an exemplary estimated wait time (EWT) function 113, such as is disclosed in U.S. Pat. No. 5,506,898 assigned to the same assignee, for estimating how long calls will have to wait in queue before being served by an agent.

Telephone system 105 and Internet 102 are interconnected by a gateway 104 which converts Internet calls to telephone calls and vice versa. Client 100 may alternatively be connected to only one of networks 102 and 105, and/or call center 106 may also be connected to only one of networks 102 and 105. If they are not connected to the same one network 102 or 105, client 100 and call center 106 communicate through gateway 104.

As described so far, the communications system of FIG. 1 is conventional, as is its functionality.

Figure 2:
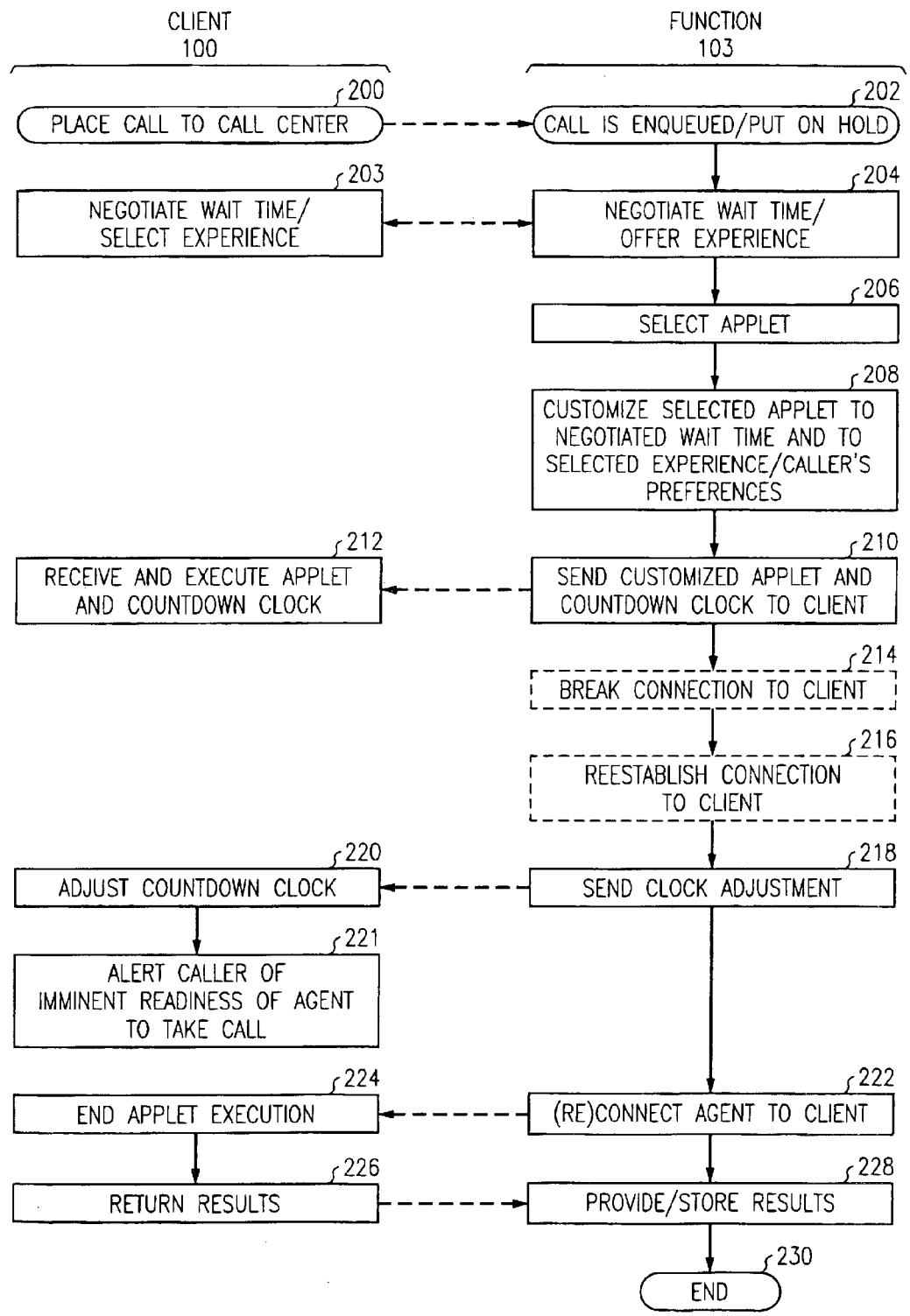
FIG. 2 is a block diagram of operations of units of the communications network of FIG. 1 that implement the illustrative embodiment of the invention.

According to the invention, ACD 107 stores in its memory a plurality of applets 96–98 and an executable applet-selection function 103. Alternatively, applets 96–98 and function 103 may be implemented by a separate adjunct processor which cooperates with ACD 107. Applet 96 is a negotiation applet, described further below. Applets 97–98 may comprise any desired functionality. For example, they can be music or other audio programs, image or moving-video programs, multimedia programs, games, contests, questionnaires, order forms etc. Function 103 selects and customizes one of the applets 97–98 for any particular on-hold client 100. The operations of functions 103, and of client 100 in response thereto, are shown in FIG. 2.

Things proceed conventionally from when a client 100 places/receives an Internet call to/from call center 106, at step 200, until the client (i.e., the client's call) is enqueued in one of the call queues 111–112 at ACD 107 of call center 106, at step 202. If the call is not enqueued, e.g., because an agent was available to handle it immediately upon its arrival or because it is an outbound call, then things proceed conventionally until an agent places the call on hold. The call can be a voice call or a data call. Execution of function 103 is then invoked, at step 202. Function 103 causes ACD 107 to negotiate an in-queue or on-hold wait time with client 100, at steps 204 and 206. This illustratively involves EWT function 113 making an estimate (at one or more levels of service, where lower service equals longer wait time) of the expected wait time that the call will spend in queue or on hold waiting for an agent, and then downloading a negotiation applet 96 to client 100 that notifies client 100 of the estimated wait times and gives the client an option of agreeing to one of the wait times or not agreeing to the wait times and instead selecting being called back at a later time. Negotiation applet 96 offers an inducement for agreeing to a longer wait time, such as lower cost. Negotiation applet 96 may also verify the client's membership or classification with the called party (e.g., gold card or platinum card holder of the called credit card service provider). Negotiation applet 96 further allows the client to select an in-queue experience (e.g., type of entertainment or information) from a list of options (e.g., sales information, product descriptions, order form, survey, audiovisual entertainment, music, nothing, etc.). Negotiation applet 96 then returns the client's selections and other data that it has gathered on client 100 to ACD 107.

Based on the negotiated wait time, function 103 selects one or more of the applets 97–98 whose execution time will fit within the negotiated wait time, at step 206, and then uses any available caller preferences—obtained, for example, from the caller's selection of an in-queue experience, or from a data base of call center 106 based on the ANI (automated number identification) or URL (universal resource locator) of, or an account code or some other ID provided by, the caller—along with the estimated wait time to select one (or more) of the applets selected at step 206 and to customize that applet 98 for the identified customer, at step 208. For example, if it is determined that this is a caller who tends to buy items that are on sale, and the negotiated wait time is two minutes, then a two-minute audio-visual presentation on the latest sale offering is selected. Or, if the caller is unidentified and the estimated wait time is three minutes, a three-and-half minute questionnaire is pared down to a three-minute questionnaire and is sent for display to the caller with an enticement that filling out the questionnaire will enter the caller in a drawing for a prize. Once the applet 98 has be selected and customized, function 103 causes ACD 107 to send that applet 98 to client 100 for execution, along with a countdown clock function which counts down the negotiated wait time and displays the remaining wait time on a display of client 100, at step 210. Client 100 receives the customized applet 98 and countdown clock and executes them, at step 212. (Optionally, if the connection between ACD 107 and client 100 includes a telephone-network (circuit-switched) connection, ACD 107 may break this connection at this time, at step 214, in order to conserve circuit-switching resources of telephone network 105, and then reestablish the connection, at step 216, when the negotiated or estimated wait time is up or the call is taken off-hold or dequeued.) Preferably, function 103 causes ACD 107 to send adjustments—updates—to the time shown by the countdown clock, at step 218, as conditions at ACD 107 change and the estimated wait time is recomputed, which cause client 100 to adjust the time shown by the displayed countdown clock accordingly, at step 220.

When an agent of call center 106 is about to become available and ready to take the caller's enqueued call or to take the call off-hold (as determined, for example, by only X seconds remaining on the countdown clock), the clock or applet 98 causes client 100 to alert its user, for example by giving an audio and/or visual notification to the user, at step 221. When the agent does become available, ACD 107 (re)connects the agent to client 100, at step 222. This generally causes client 100 to end execution of applet 98, at step 224. If applet 98 was interactive, ending its execution may involve sending the results of that interaction with the user of client 100 (e.g., data provided by the user) back to ACD 107, at step 226, for use by the agent in handling the call (e.g., for completing the filling out of an order form started by the user during execution of applet 98) and/or for future use (e.g., for customizing an applet for that user the next time that he or she calls). Function 103 causes the results received from applet 98 to be provided to the agent who is handling the call and/or to be stored in a client database of call center 106, at step 228. Execution of function 103 then ends for this call, at step 230, and handling of the call proceeds in a conventional manner until such time as the call may again be put on hold, when the operations shown in FIG. 2 may be repeated.

Of course, various changes and modifications to the illustrative embodiment described above may be envisioned. These changes and modifications can be made without departing from the spirit and the scope of the invention and without diminishing its attendant advantages. It is therefore intended that such changes and modifications be covered by the following claims except insofar as limited by the prior art.

What is claimed is:

1. A communications method comprising:

putting a communication from a user's terminal on hold;

customizing a computer program for the user; and downloading the customized computer program to the user's terminal for execution by the user's terminal while the terminal's communication is on hold.

2. The method of claim 1 further comprising:

in response to the downloading, the user's terminal executing the downloaded program while the said terminal's communication is on hold;

taking the communication off hold; and in response to the taking, the said terminal ceasing execution of the downloaded program.

3. The method of claim 1 wherein:

putting the communication on hold comprises one of (a) a handler of the communication putting the communication on hold, and (b) in response to receiving the communication, enqueueing the communication until a resource becomes available to handle the communication.

4. The method of claim 1 further comprising:

taking the communication off hold; and prior to taking the communication off hold, alerting the user that the communication is about to be taken off hold.

5. The method of claim 1 wherein:

putting the communication on hold comprises negotiating with the terminal an amount of time that the communication will remain on hold.

6. The method of claim 5 wherein:

customizing a computer program comprises selecting a computer program that can be executed within the negotiated amount of time.

7. The method of claim 5 wherein:

downloading a computer program includes downloading a countdown program whose execution indicates to the user progress of expiration of the negotiated amount of time.

8. The method of claim 7 further comprising:

in response to a change in conditions affecting the amount of time that the communication will remain on hold, adjusting the amount of time indicated by the countdown program to reflect the change.

9. The method of claim 1 wherein:

customizing a computer program comprises estimating an amount of time that the communication will remain on hold; and selecting a computer program that can be executed within the estimated amount of time.

10. The method of claim 9 wherein:

downloading a computer program includes downloading a countdown program whose execution indicates to the user progress of expiration of the estimated amount of time.

11. The method of claim 10 further comprising:

in response to a change in conditions affecting the amount of time that the communication will remain on hold, adjusting the amount of time indicated by the countdown program to reflect the change.

12. The method of claim 1 wherein:

customizing a computer program comprises selecting a presentation program, whose execution presents information to the user.

13. The method of claim 1 wherein:

customizing a computer program comprises selecting an interactive program whose execution causes the terminal to interact with the user.

14. The method of claim 13 further comprising:

receiving from the terminal information gathered at the terminal via said execution of the downloaded program.

15. The method of claim 1 wherein:

customizing a computer program comprises identifying at least one of the user and the terminal; and customizing the computer program for the identified at least one of the user and the terminal.

16. The method of claim 1 wherein:

customizing a computer program comprises identifying a universal resource locator (URL) of a Web page from which the user initiated the communication; and customizing the computer program for the identified URL.

17. The method of claim 1 wherein:

putting a communication on hold comprises putting on hold a voice or a data call between the terminal and a call center.

18. An apparatus that performs the method of claim 1 or 3 or 4 or 5 or 6 or 7 or 8 or 9 or 10 or 11 or 12 or 13 or 14 or 15 or 16 or 17.

19. The apparatus of claim 18 comprising an automatic call distributor.

20. A communications method comprising:

having a communication between a user's terminal and a communications entity put on hold by the communications entity;

receiving at the user's terminal a computer program customized for the user from the communications entity; and executing the received computer program at the said terminal while the communication is on hold.

21. The method of claim 20 wherein:

having a communication put on hold comprises negotiating with the communications entity an amount of time that the communication will remain on hold.

22. The method of claim 20 further comprising:

having the communication taken off hold by the communications entity; and in response, the terminal ceasing execution of the received computer program.

23. The method of claim 22 wherein:

executing comprises interacting with the user by executing an interactive said received computer program; and ceasing execution comprises sending to the communications entity information gathered from the user via the interacting.

24. The apparatus of claim 23 comprising a user communications terminal.

25. The method of claim 20 further comprising:

having the communication taken off hold by the communications entity;

prior to having the communication taken off hold, the terminal receiving notification from the communications entity that the communication is about to be taken off hold; and in response, the terminal alerting the user.

26. An apparatus that performs the method of claim 20 or 21 or 22 or 23 or 25.

27. A computer-readable medium contain software which, when executed in a computer, causes the computer to perform the method of claim 1 or 2 or 3 or 4 or 5 or 6 or 7 or 8 or 9 or 10 or 11 or 12 or 13 or 14 or 15 or 16 or 17 or 20 or 21 or 22 or 23 or 25.

* * * * *